(12) United States Patent
Kim et al.

(10) Patent No.: US 9,369,326 B2
(45) Date of Patent: *Jun. 14, 2016

(54) METHOD OF TRANSMITTING PILOT BITS IN A WIRELESS COMMUNICATION SYSTEM

(71) Applicant: LG ELECTRONICS INC., Seoul (KR)

(72) Inventors: Hak Seong Kim, Seoul (KR); Bong Hoe Kim, Ansan-si (KR); Dong Wook Roh, Seoul (KR); Joon Kui Ahn, Seoul (KR); Dong Youn Seo, Seoul (KR); Jung Hoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/663,163

(22) Filed: Mar. 19, 2015

(65) Prior Publication Data

US 2015/0200798 A1   Jul. 16, 2015

Related U.S. Application Data

(63) Continuation of application No. 11/917,419, filed as application No. PCT/KR2006/002251 on Jun. 13, 2006, now Pat. No. 9,014,165.

(30) Foreign Application Priority Data

Jun. 15, 2005   (KR) .................. 10-2005-0051280

(51) Int. Cl.
| H04L 29/06 | (2006.01) |
| H04L 27/26 | (2006.01) |
| H04L 5/00 | (2006.01) |
| H04L 25/02 | (2006.01) |

(Continued)

(52) U.S. Cl.
CPC .......... *H04L 27/2637* (2013.01); *H04L 5/0021* (2013.01); *H04L 5/0048* (2013.01); *H04L 25/0226* (2013.01); *H04L 25/03343* (2013.01); *H04W 48/08* (2013.01)

(58) Field of Classification Search
None
See application file for complete search history.

(56) References Cited

U.S. PATENT DOCUMENTS

| 6,980,539 B2 | 12/2005 | Hanada et al. |
| 7,269,127 B2 | 9/2007 | Mody et al. |
| 7,433,419 B2 | 10/2008 | Yun et al. |

(Continued)

FOREIGN PATENT DOCUMENTS

WO    2004/056022    7/2004

OTHER PUBLICATIONS

Dinis R. et al.: "A Multiple Access Scheme for the Uplink of Broadband Wireless Systems," Global Telecommunications Conference, 2004, IEEE Dallas, TX, USA, Nov. 29, 2004, pp. 3803-3812, XP 010758449, ISBN 0-7803-8794-5.

(Continued)

*Primary Examiner* — Vincelas Louis
(74) *Attorney, Agent, or Firm* — Lee, Hong, Degerman, Kang & Waimey; Jonathan Kang; Harry Lee (57) ABSTRACT

A method of allocating pilot bits in a wireless communication system using a multiple carrier modulation (MCM) is disclosed. The method includes allocating a plurality of precoded data symbols precoded by a precoding matrix module and a plurality of non-precoded pilot bits to a plurality of subcarriers, and transmitting the allocated precoded data symbols and the allocated non-precoded pilot bits.

6 Claims, 7 Drawing Sheets

(51) Int. Cl.
*H04L 25/03* (2006.01)
*H04W 48/08* (2009.01)

(56) References Cited

U.S. PATENT DOCUMENTS

| | | |
|---|---|---|
| 7,436,758 B2 | 10/2008 | Suh et al. |
| 7,567,639 B2 | 7/2009 | Huh et al. |
| 7,720,168 B2 | 5/2010 | Su et al. |
| 7,787,546 B2 * | 8/2010 | Khan .................. H04L 27/2614 375/232 |
| 8,380,899 B2 | 2/2013 | Barrenscheen et al. |
| 2003/0179776 A1 | 9/2003 | Sumasu et al. |
| 2004/0100939 A1 | 5/2004 | Kriedte et al. |
| 2005/0013279 A1 | 1/2005 | Hwang et al. |
| 2005/0058217 A1 | 3/2005 | Sandhu et al. |
| 2005/0073948 A1 | 4/2005 | Jwa |
| 2005/0088960 A1 | 4/2005 | Suh et al. |
| 2005/0135324 A1 | 6/2005 | Kim et al. |
| 2005/0243939 A1 | 11/2005 | Jung et al. |
| 2006/0245510 A1 | 11/2006 | Oketani |
| 2007/0041311 A1 | 2/2007 | Baum et al. |
| 2007/0071119 A1 | 3/2007 | Davydov et al. |
| 2011/0013585 A1 | 1/2011 | Jitsukawa et al. |
| 2012/0287974 A1 | 11/2012 | Muralidhar et al. |

OTHER PUBLICATIONS

Samsung Telecommunications America, L.P., "A Power Efficient OFDM Wireless Communication System," Jan. 2005, 10 pages.

* cited by examiner

METHOD OF TRANSMITTING PILOT BITS IN A WIRELESS COMMUNICATION SYSTEM

CROSS-REFERENCE TO RELATED APPLICATIONS

This application is a continuation of U.S. Application Ser. No. 11/917,419, filed on Dec. 13, 2007, now U.S. Pat. No. 9,014,165, which is the National Stage filing under 35 U.S.C. 371 of International Application No. PCT/KR2006/002251, filed on Jun. 13, 2006, which claims the benefit of earlier filing date and right of priority to Korean Patent Application No. 10-2005-0051280, filed on Jun. 15, 2005, the contents of which are all hereby incorporated by reference herein in their entirety.

TECHNICAL FIELD

The present invention relates to a method of transmitting pilot bits, and more particularly, to a method of transmitting pilot bits in a wireless communication system.

BACKGROUND ART

Figure 1:
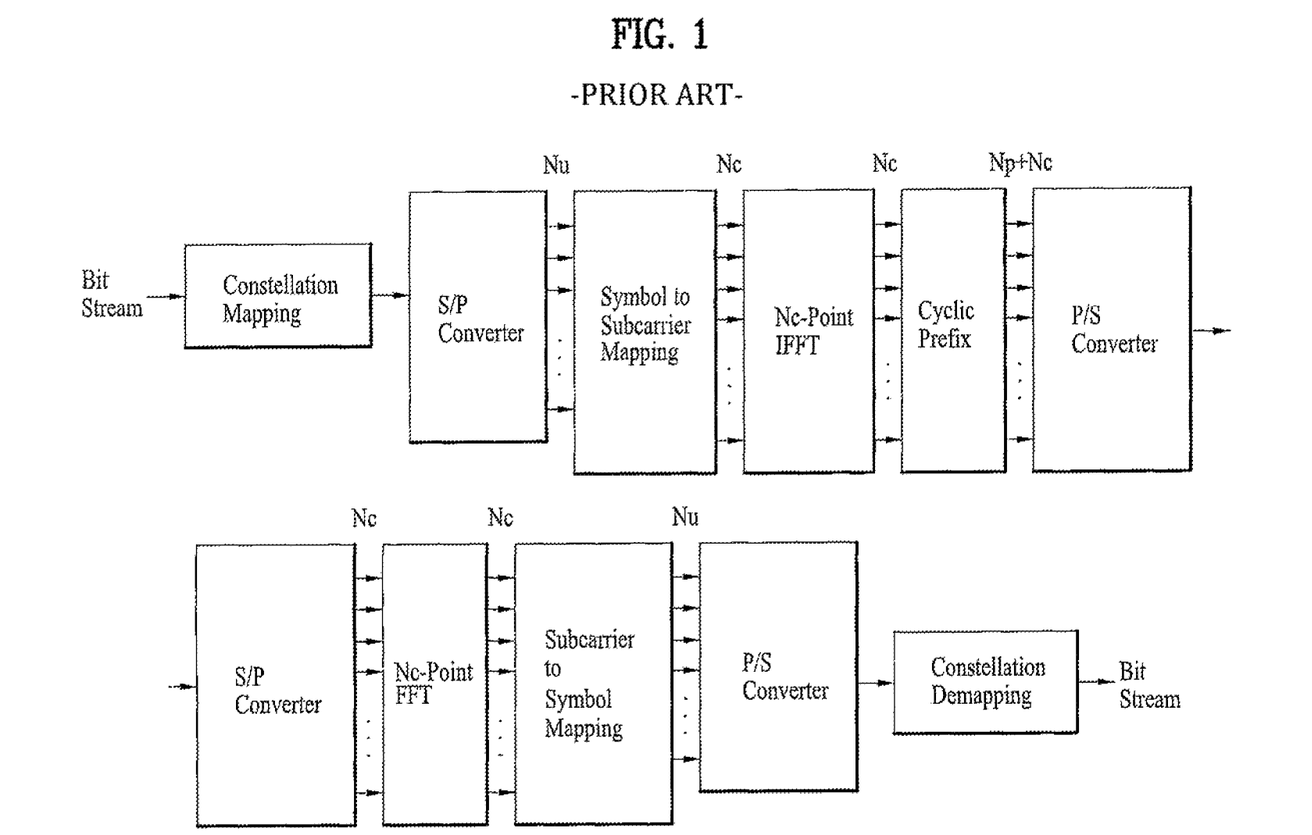
FIG. 1 illustrates a block diagram of transmitter/receiver ends using an OFDMA scheme in an uplink direction.

FIG. 1 illustrates a block diagram of transmitter/receiver ends using an OFDMA scheme in an uplink direction. First, data stream sent to users are digitally modulated using modulation techniques such as Quadrature Phase Shift Keying and 16 Quadrature Amplitude Modulation. After the modulation, a. constellation mapping is performed on the modulated data streams which are then passed through serial-to-parallel converter and converted into Nu number of parallel symbols. Here, Nu represents a number of subcarriers allocated to a mobile station (MS). From a total of Nc number of subcarriers, these symbols are mapped to Nu number of subcarriers while remaining subcarriers (Nc−Nu) are mapped to zero, or put differently, the remaining subcarriers are padded (e.g., zero padding). Here, No represents a total number of subcarriers before a cyclic prefix is added. That is, the remaining Nc−Nu number of subcarriers are zero padded and then is applied Nc-point Inverse Fast Fourier Transform (IFFT).

Furthermore, in order to reduce inter-symbol interference, a cyclic prefix is added to the symbols and passed through a parallel-to-serial converter, which is then transmitted to channels. The symbols transmitted via channels are mapped to subcarriers in amount of Np+Nc according to IFFT and the cyclic prefix.

As illustrated in FIG. 1, the procedures of an OFDMA receiver are same as that of the transmitter except in reverser order.

Figure 2A:
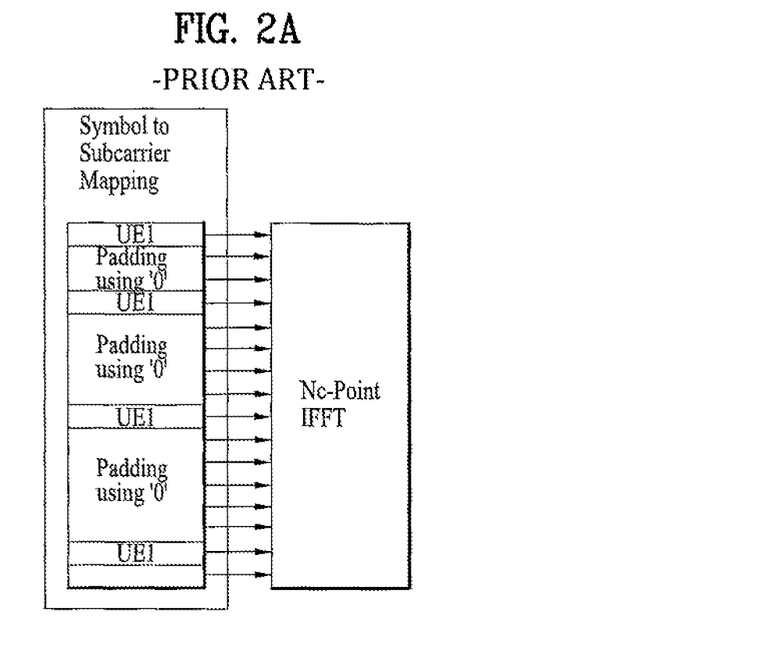
FIG. 2a illustrates a random allocation of subcarriers.
Figure 2B:
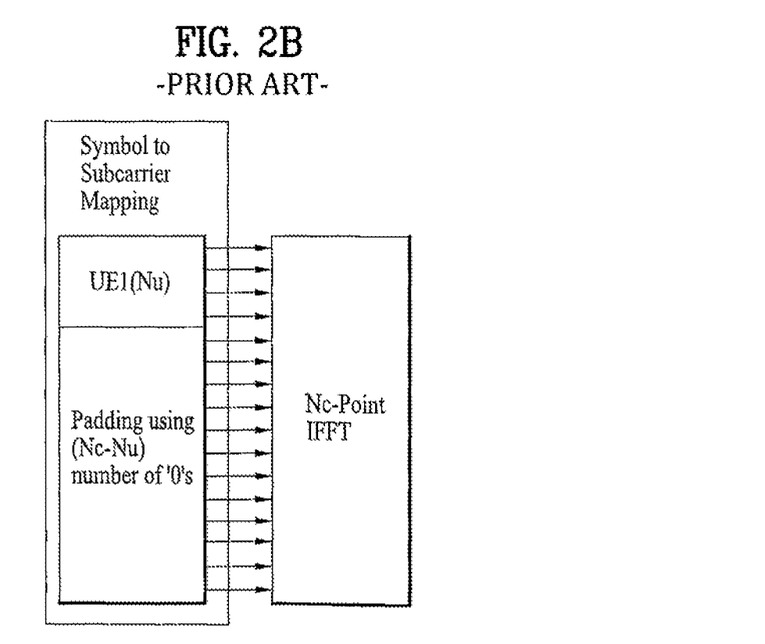
FIG. 2b illustrates allocating the subcarriers by collecting the subcarriers in specified frequency bands.
Figure 2C:
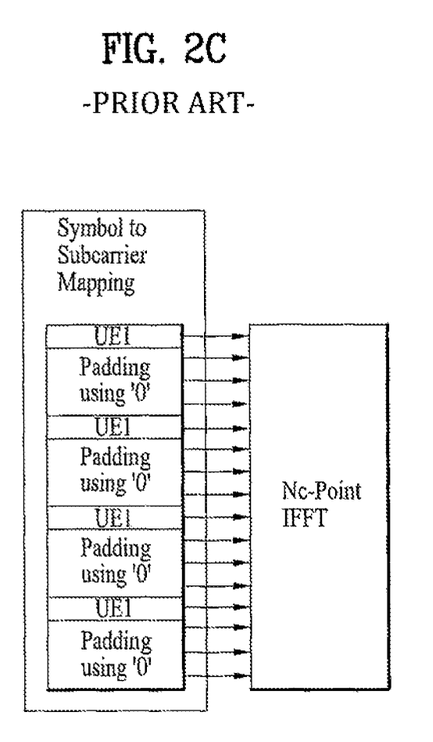
FIG. 2c illustrates allocating each subcarrier throughout the entire frequency bands in equal intervals.

FIGS. 2a-2c illustrate methods of mapping Nu number of subcarriers out of Nc total number of subcarriers according to conventional art. FIG. 2a illustrates a random allocation of subcarriers, FIG. 2b illustrates allocating the subcarriers by collecting the subcarriers in specified frequency bands, and FIG. 2c illustrates allocating each subcarrier throughout the entire frequency bands in equal intervals.

Since the mapping methods illustrated in FIGS. 2a-2c make use of the entire frequency bands, frequency diversity can be achieved. However, because each subcarrier is allocated individually, timing synchronization of OFDM symbol of different users can be off, and signal quality can suffer due to nearby subcarriers of different users if Doppler frequency is large. Furthermore, in the conventional OFDMA scheme, a single user uses a plurality of subcarriers and as a result, Peak-to-Average Power Ratio (PAPR) characteristics can get worse.

The OFDMA signals in a time domain comprises a large number of subcarriers modulated independently. Consequently, if these subcarriers are added on the same phase, a problem of a large size signal being generated can occur. Even though average power remains fixed at a certain level, a maximum power can increase drastically which in turn increases the PAPR. If the PAPR is increased, Analog-to-Digital Conversion (ADC) and Digital-to-Analog Conversion (DAC) becomes more complex while efficiency of a Radio Frequency (RF) power amplifier is reduced. In order to resolve these types of PAPR heating problem, several resolution encoding methods have been proposed including using signal distortion or a special forward error correction symbol set (excluding OFDM symbol) having a large PAPR.

Figure 3:
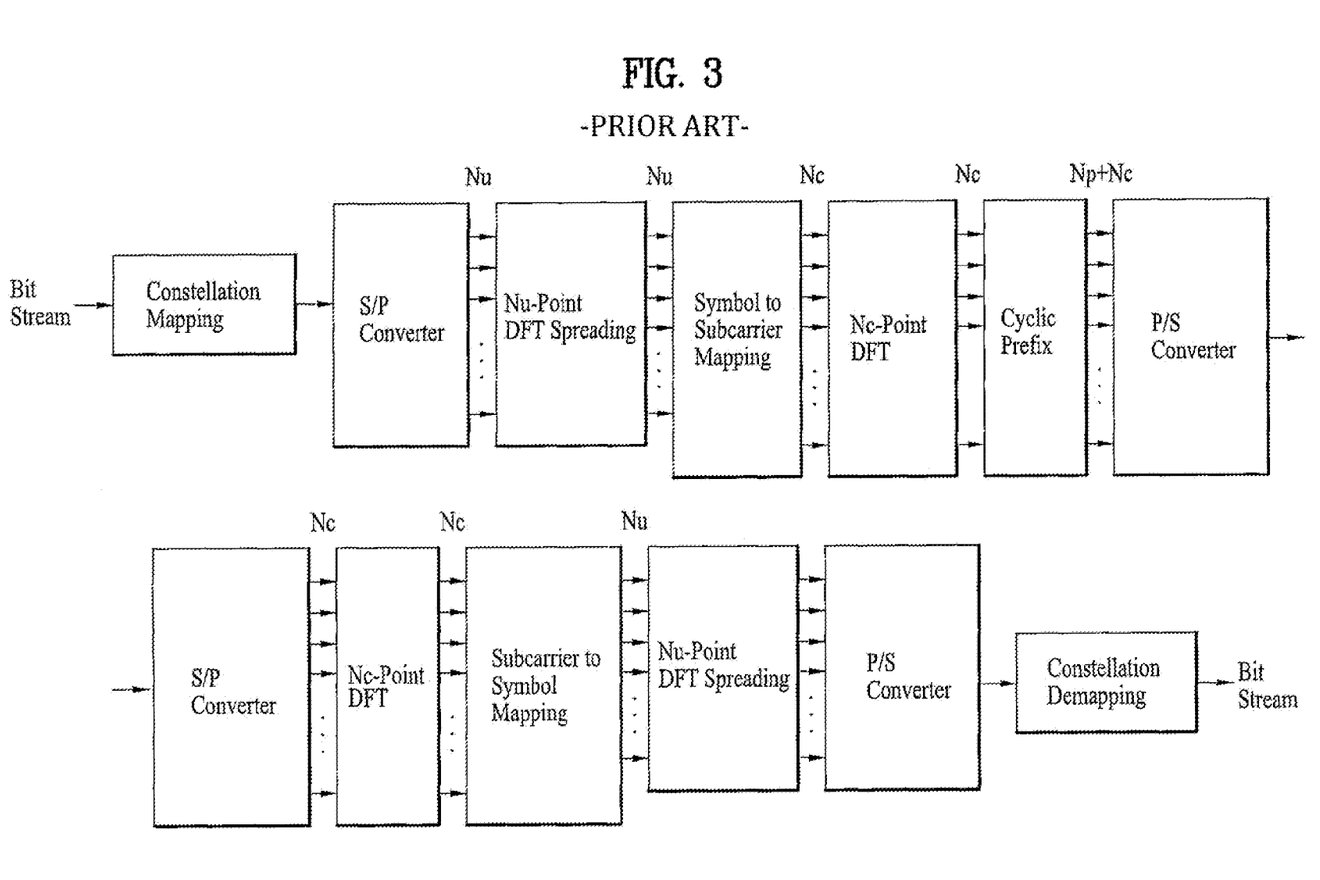
FIG. 3 is a block diagram illustrating transmitting/receiving ends using a DFT spread OFDMA scheme.

In order to improve the PAPR characteristics, as illustrated in FIG. 3, a DFT spread OFDMA scheme has been proposed. FIG. 3 is a block diagram illustrating transmitting/receiving ends using a DFT spread OFDMA scheme.

The difference between the DFT spread OFDMA scheme and the conventional OFDMA scheme is that in the DFT spread OFDMA, Nu number of data symbols are Nu-point DFTed. Thereafter, as illustrated in FIG. 2c, the converted data symbols are mapped in equal intervals to the entire No number of subcarriers. Compared to the conventional OFDMA, the DFT spread OFDMA has improved PAPR characteristics.

Because data in the DFT spread OFDMA system are allocated in the frequency domain, it is necessary to perform channel estimation on the channels of the frequency domain. In the conventional OFDMA system, data and pilot are simultaneously allocated in the frequency domain, in the DFT spread OFDMA, the data is spread via the DFT matrix. As such, if the pilot is simultaneously processed with the remaining data, the spreading operation is also performed on the pilot, making channel estimation difficult.

DISCLOSURE OF THE INVENTION

Accordingly, the present invention is directed to a method of transmitting pilot bits in a wireless communication system that substantially obviates one or more problems due to limitations and disadvantages of the related art.

An object of the present invention is to provide a method of allocating pilot bits in a wireless communication system using a multiple carrier modulation (MCM).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of allocating pilot bits in a wireless communication system using a multiple carrier modulation (MCM) is disclosed. The method includes allocating a plurality of precoded data symbols preceded by a precoding matrix module and a plurality of non-precoded pilot bits to a plurality of subcarriers, and transmitting the allocated preceded data symbols and the allocated non-precoded pilot bits.

In another aspect of the present invention, a method of allocating pilot bits in a wireless communication system using a multiple carrier modulation (MCM) is disclosed. The method includes allocating a plurality of non-precoded pilot bits to a plurality of subcarriers, and transmitting the allocated non-precoded pilot bits.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

As discussed above with respect to conventional DFT spread OFDMA system, the bit stream data is spread by the DFT matrix and thereafter transmitted via subcarriers which are allocated to specific user(s) in equal intervals. In the transmission of data according to the conventional system, data symbol and pilot bit are transmitted after being spread together. In other words, the pilot bit and the data symbol are spread by the same method. More specifically, the pilot bits is spread by the DFT matrix and mapped to subcarriers thereafter. At this time, the pilot bit is spread to the entire frequency domain having Nc number of subcarriers. That is, the pilot bit-mapped subcarriers are distributed across the entire frequency domain and therefore causes inconsistent power levels, making channel estimation difficult. To address this problem, the present invention proposes transmitting a pilot in a DFT spread OFDMA system.

In the present invention, the term "symbol" can also be referred to as "bit," "signal," and a like. As such, a term 'pilot bit' can also be referred to as 'pilot symbol' or simply, 'pilot.'

Figure 4:
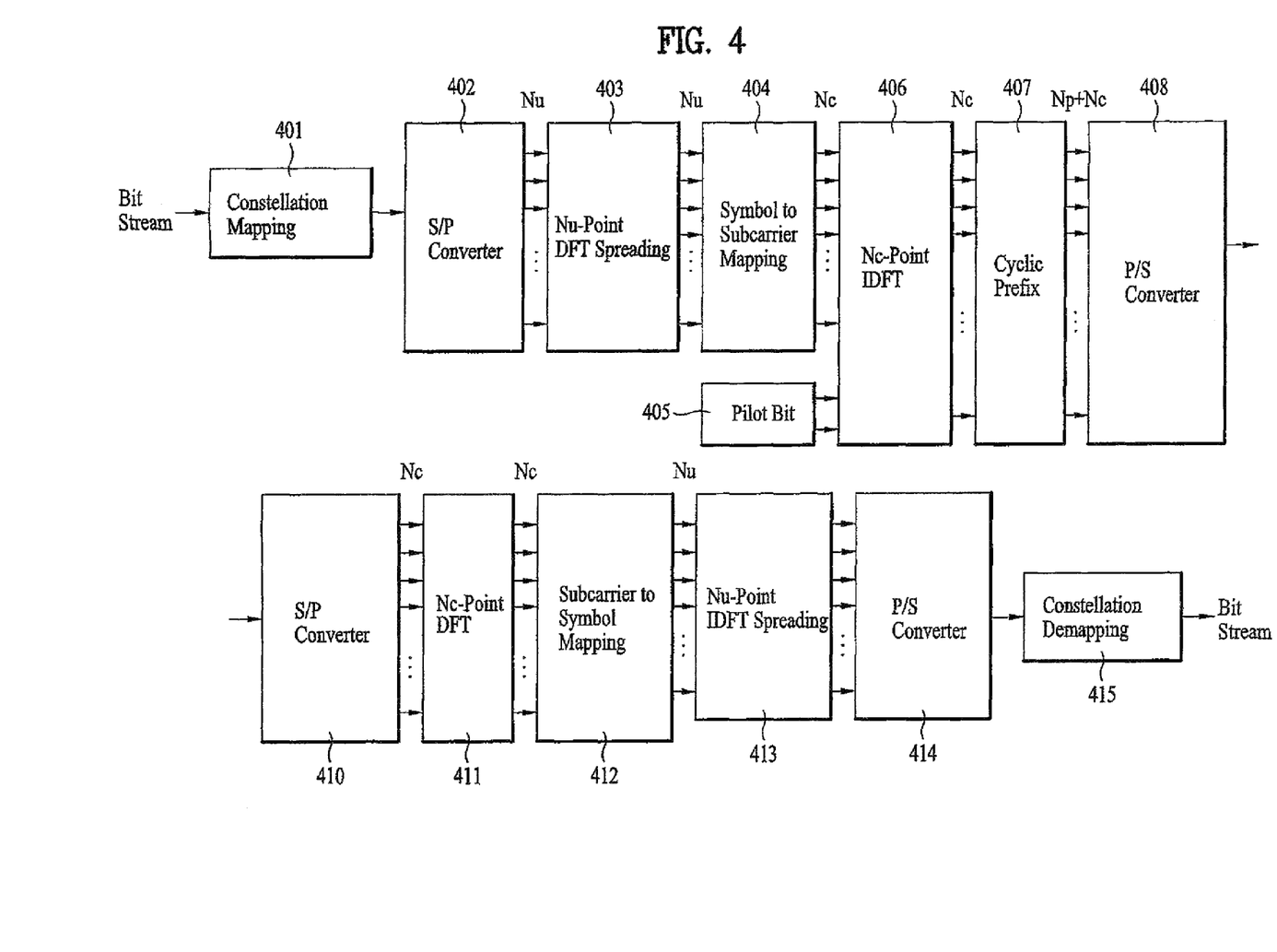
FIG. 4 illustrates a block diagram of a transmitter and a receiver applying a DFT spread OFDMA scheme according an embodiment of the present invention.
Figure 5:
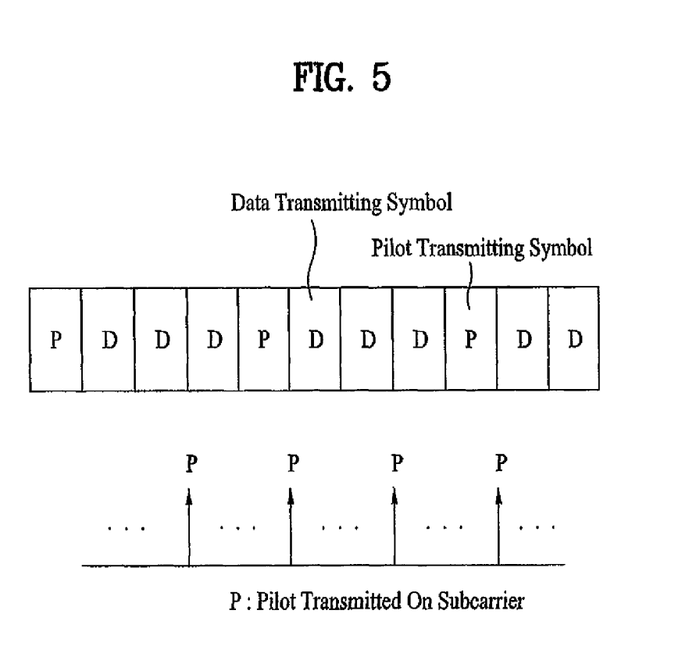
FIG. 5 illustrates a pilot bit transmission method and formation of subcarriers associated with the method according to a first embodiment of the present invention.

FIG. 4 illustrates a block diagram of a transmitter and a receiver applying a DFT spread OFDMA scheme according an embodiment of the present invention. In addition, FIG. 5 illustrates a pilot bit transmission method and formation of subcarriers associated with the method according to a first embodiment of the present invention. Hereafter, the first embodiment will be described with respect to FIGS. 4 and 5.

In the first embodiment, a pilot bit is not spread by the DFT matrix. Rather, the pilot bit is allocated to Nc number of subcarriers directly (without being processed by the DFT matrix) and then transmitted. Because the pilot bit is not spread by the DFT matrix, the pilot bits are allocated to a specified number of subcarriers from available Nc number of subcarriers. With this, the power level of the pilot signal on the frequency domain can better maintain power levels, making simpler channel estimation by the receiver.

As illustrated in FIG. 4, the pilot bits is mapped to subcarriers without going through the DFT matrix spreading process. However, the data symbol is mapped to subcarriers after going through the OFT matrix spreading process.

A more detailed description of FIG. 4 is as follows. Data, in bits, is transmitted from a transmitting end and is passed through a constellation mapping module 401. Here, the data can be associated with more than one source. Thereafter, the data symbols are then passed through a serial-to-parallel (SIP) converter 402 in which the serially-processed data symbols are converted into parallel data symbols. The data symbols are then precoded or spread by a Nu-Point DFT Spreading module 403. Here, Nu refers to a number of data symbols that are precoded by a DFT matrix. After the data symbols have been spread, they are then processed by a symbol-to-subcarrier mapping module 404. In the symbol-to-subcarrier mapping module 404, the precoded data symbols are allocated to subcarriers. Here, the allocation takes place in a frequency domain.

It is at this point the pilot bits 405 can be allocated as well. In this embodiment as well as other embodiments, as mentioned above, the pilot bits can be referred to as pilot symbols or pilots as well. As discussed above, unlike the data symbols, the pilot bits 405 are not precoded. As such, the pilot bits 405 can be allocated along with the precoded data symbols to the subcarriers at the symbol-to-subcarrier mapping module 404. Alternatively, the pilot bits 405 can be allocated after the data symbols have been allocated to the subcarriers. In such a case, the symbol-to-subcarrier mapping module 404 would allocate the data symbols and reserve certain subcarriers for the pilot bits 405. For example, the symbol-to-subcarrier mapping module can reserve every fifth subcarrier for allocating the pilot bits.

After the precoded data symbols and the pilot bits are allocated in the frequency domain, these symbols are physically allocated in Nc-Point IDFT module 406. Here, Nc refers to a number of subcarriers which can be more than the number of the symbols. After the symbols are processed by the Nc-Point IDFT module 406, each symbol is added a cyclic prefix 407. The cyclic prefix 407 is a repeat of the end of the symbol at the beginning whose purpose is to allow multipath to settle before the main data arrives for othogonality reasons. Thereafter, the cyclic prefix-added data and pilot bits are processed through a parallel-to-serial (P/S) converter 408 and then transmitted to a receiving end.

At the receiving end, the processed symbols, as described above, can be decoded by a reverse process. For example, since the symbols were processed by the P/S converted when transmitted, the receiving end can apply the S/P converter 410, followed by a Nc-Point DFT module 411 to counter Nc-Point IDFT 406. Thereafter, the symbols can be processed through a subcarrier-to symbol mapping module 412 and omitting a few processes, ending with processing the symbols using a constellation demapping module 415. Thereafter, the symbols can be processed through a subcarrier-to symbol mapping module 412 and omitting a few processes, ending with processing the symbols using a constellation demapping module 415. After processing the symbols through this reverse process, then the symbols can be properly decoded.

FIG. 5 illustrates data symbols and independently (non-precoded) pilot bits allocated to subcarriers. Data (D) of FIG. 5 corresponds to the data symbols after they are processed by a Nu Point DFT Spread module in which the data symbols are spread by the DFT matrix. Pilot (P) corresponds to pilot bits which are not processed through the Nu Point DFT Spread module but allocated independently into an Inverse DFT (IDFT). In short, FIG. 5 represents the spread (precoded) data symbols and the pilot bits, which have been not spread, allocated to subcarriers by a symbol-to-subcarrier mapping module. As illustrated in FIG. 5, Ps are allocated to the subcarriers on a specific frequency out of Nc number of available subcarriers. Through this, the pilot signals are transmitted from a frequency having a constant or reliable power level to make channel estimation by the receiver simpler.

There are two means by which the pilot symbols/bits, which have not been precoded, can be allocated to subcarriers. First, when the precoded data symbols are allocated to subcarriers, certain subcarriers can be reserved or put differently, pre-allocated for allocation of the pilot bits. Therefore, when the pilot bits are allocated, they are allocated to the reserved subcarriers. For example, these reserved subcarriers can be be located between the subacarriers for the data symbols and/or can be assigned at specified intervals, as illustrated in FIG. 5.

Second, the non-precoded pilot bits and the precoded data symbols can be allocated at the same time by the symbol-to-subcarrier mapping module. Here, although the source of the symbols may be different, the allocation of these symbols can be performed by the symbol-to-subcarrier module, without the need for reserving certain subcarriers.

Further, as described above, FIG. 4 illustrates a block diagram of a transmitter and a receiver applying a DFT spread OFDMA scheme according an embodiment of the present invention. Hereafter, the second embodiment will be described with respect to FIGS. 4 and 5. In the second embodiment of the present invention, the pilot and the data are transmitted separately. As illustrated in FIG. 5, the bit stream transmitted to a specified user includes symbols, each of which contain only the pilot or the data. In this second embodiment, as illustrated in FIG. 4, the DFT spreading is not performed on the pilot bits.

The second embodiment has superior PAPR characteristics than those of the first embodiment. In the first embodiment, the pilot does not perform DFT spreading, and the pilot and data symbols are not separated. Rather, the data and the pilot are transmitted simultaneously in the first embodiment. As a result, an advantage of the DFT spread OFDMA scheme, which reduces the PAPR of the conventional OFDMA scheme, cannot be fully utilized.

In the second embodiment also, the pilot is mapped to a specific subcarrier on the frequency domain and does not go through the DFT spreading procedure. Consequently, the PAPR characteristics can be deteriorated by the pilot bit being not spread by the DFT as opposed to being spread by the DFT. To combat this problem, as illustrated by second embodiment, if the symbols for the data and the symbols for the pilot are separated and then transmitted, the transmission of the pilot bit, like the transmission of the data symbol, can experience reduction in the PAPR.

In the second embodiment, information related to channel estimation in certain parts of the frequency domain are not included since the symbol for the pilot and the symbol for the data are transmitted independently. Here, the pilot is allocated to a specific area of the frequency domain and not to the entire frequency domain, and in the channels of other frequency area (area where pilot is not allocated), interpolation is performed thereon to estimate the status of the channels. Furthermore, since the pilot is not transmitted to the entire frequency domain, the subcarrier, which is not used for transmitting the pilot, can be used to transmit other user data. FIG. 5 illustrates the pilots allocated to the subcarriers of specified frequencies. As described above, the non-pilot transmitting subcarriers can be used to transmit data. Furthermore, for channel estimation in frequency areas where the pilot is not transmitted, interpolation can be performed to make channel estimation.

Figure 6:
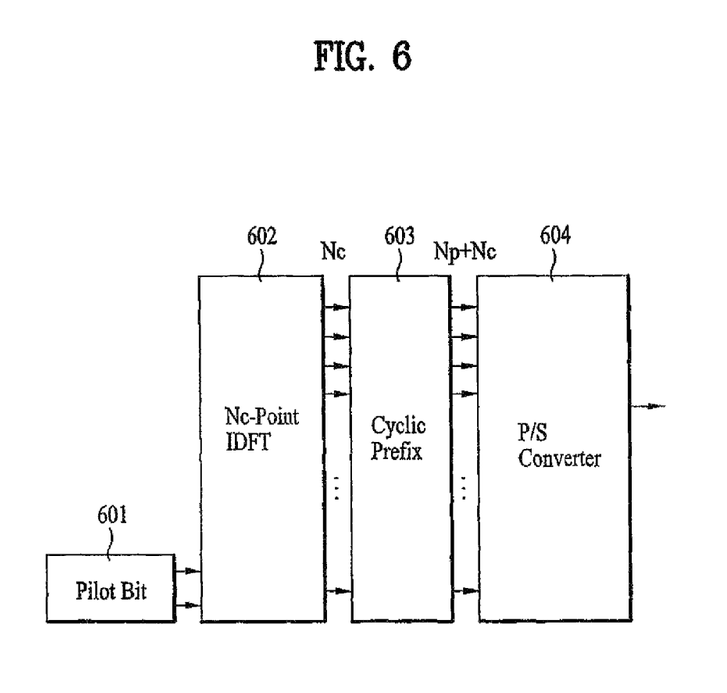
FIG. 6 illustrates allocation of non-precoded pilot bits to subcarriers.

Alternatively, FIG. 6 illustrates allocation of non-precoded pilot bits to subcarriers. In the discussion above, the non-precoded pilot bits 601 are allocated separately from the preceded data symbols. It is possible that either only the non-precoded pilot bits 601 are allocated to subcarriers or only the precoded data symbols are allocated to subcarriers. That is, the pilot bits 601 can be allocated to subcarriers even in the absence of the data symbols. If the pilot bits 601 are the only symbols being allocated to the subcarriers, the actual mapping takes place at Nc-Point IDFT module 602. Here, a size (length) of IDFT can be different when the preceded data symbols are passed through compared to when the non-precoded pilot bits are passed through. In this embodiment, only the pilot signals are transmitted while the data signals are not transmitted. In short, the size of the IDFT varies depending on whether the data symbols are passed through or the pilot bits are passed through. As mentioned above, a cyclic prefix 603 is added to each symbol before being transmitted. After being added, the symbol is processed through the P/S converter 604 and then transmitted to the receiving end.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting pilot signals at a terminal in a wireless communication system using an Orthogonal Frequency Division Multiple Access (OFDMA) scheme, the method comprising:

applying transform precoding only to a plurality of data symbols by a transform precoder of the terminal;

allocating the plurality of data symbols to a first plurality of subcarriers and allocating a plurality of pilot signals to a second plurality of subcarriers, wherein the plurality of pilot signals are not transform precoded by the terminal;

transmitting, at a first point of time, a first non-precoded plurality of pilot signals without the precoded plurality of data, wherein the first non-precoded plurality of pilot signals are allocated to locations that are reserved as locations to which the precoded plurality of data symbols are not allocated;

transmitting, at a second point of time, the precoded plurality of data symbols without the first non-precoded plurality of pilot signals, wherein a receiver performs channel estimation for the precoded plurality of data symbols based on the first non-precoded plurality of pilot signals that are not transmitted at the second point of time; and transmitting, at a third point of time, both the precoded plurality of data symbols and a second non-precoded plurality of pilot signals.

2. The method according to claim 1, wherein the first non-precoded plurality of pilot signals are allocated by a symbol-to-subcarrier mapping module, and wherein both the precoded plurality of data symbols and the second non-precoded plurality of pilot signals are allocated by the symbol-to-subcarrier mapping module.

3. The method according to claim 1, wherein applying the transform precoding comprises:
using a Discrete Fourier Transform (DFT) scheme.

4. A terminal transmitting pilot signals in a wireless communication system using an Orthogonal Frequency Division Multiple Access (OFDMA) scheme, the terminal comprising:
a Radio Frequency (RF) module; and
a processor configured to:
control the RF module;
apply transform precoding only to a plurality of data symbols by a transform precoder of the terminal;
allocate the plurality of data symbols to a first plurality of subcarriers and allocating a plurality of pilot signals to a second plurality of subcarriers, wherein the plurality of pilot signals are not transform precoded by the terminal;
transmit, at a first point of time, a first non-precoded plurality of pilot signals without the precoded plurality of data, wherein the first non-precoded plurality of pilot signals are allocated to locations that are reserved as locations to which the precoded plurality of data symbols are not allocated;
transmit, at a second point of time, the precoded plurality of data symbols without the first non-precoded plurality of pilot signals, wherein a receiver performs channel estimation for the precoded plurality of data symbols based on the first non-precoded plurality of pilot signals that are not transmitted at the second point of time; and
transmit, at a third point of time, both the precoded plurality of data symbols and a second non-precoded plurality of pilot signals.

5. The terminal according to claim 4, wherein the first non-precoded plurality of pilot signals are allocated by a symbol-to-subcarrier mapping module, and wherein both the precoded plurality of data symbols and the second non-precoded plurality of pilot signals are allocated by the symbol-to-subcarrier mapping module.

6. The terminal according to claim 4, wherein the processor is further configured to apply the transform precoding using a Discrete Fourier Transform (DFT) scheme.

* * * * *